US008351397B2

(12) United States Patent
Lin (10) Patent No.: US 8,351,397 B2
(45) Date of Patent: Jan. 8, 2013

(54) METHOD AND SYSTEM FOR DETECTING ENHANCED RELATIVE GRANTS IN A WIRELESS COMMUNICATIONS SYSTEM

(75) Inventor: Jamie Menjay Lin, San Marcos, CA (US)

(73) Assignee: Broadcom Corporation, Irvine, CA (US)

( * ) Notice: Subject to any disclaimer, the term of this patent is extended or adjusted under 35 U.S.C. 154(b) by 360 days.

(21) Appl. No.: 12/686,563

(22) Filed: Jan. 13, 2010

(65) Prior Publication Data

US 2011/0149762 A1 Jun. 23, 2011

Related U.S. Application Data

(60) Provisional application No. 61/288,111, filed on Dec. 18, 2009.

(51) Int. Cl.
*H04W 4/00* (2009.01)
(52) U.S. Cl. ......... 370/332; 370/331; 455/437; 455/522
(58) Field of Classification Search ........................ None
See application file for complete search history.

(56) References Cited

U.S. PATENT DOCUMENTS

| | | | | |
|---|---|---|---|---|
| 7,672,256 B2* | 3/2010 | Pan et al. | ....................... | 370/277 |
| 7,873,324 B2* | 1/2011 | Wu et al. | ..................... | 455/67.13 |
| 2006/0252452 A1* | 11/2006 | Umesh et al. | .............. | 455/550.1 |
| 2007/0024559 A1* | 2/2007 | Ahn et al. | ........................ | 345/89 |
| 2007/0183390 A1* | 8/2007 | Sipila et al. | .................... | 370/350 |
| 2009/0036059 A1* | 2/2009 | Wu et al. | ..................... | 455/67.13 |
| 2009/0036155 A1* | 2/2009 | Wu et al. | ......................... | 455/522 |
| 2009/0221251 A1* | 9/2009 | Yi | .............................. | 455/226.3 |
| 2011/0110244 A1* | 5/2011 | Lin | ............................... | 370/252 |

OTHER PUBLICATIONS

Universal mobile Telecommunications System (UMTS); User Equipment (UE) Radio Transmission and Reception (FDD), 3GPP TS 25.101 V. 8.5.1 Release 8, Jan. 2009, p. 140-148.*

* cited by examiner

*Primary Examiner* — Donald Mills
(74) *Attorney, Agent, or Firm* — Sterne, Kessler, Goldstein & Fox P.L.L.C.

(57) ABSTRACT

Aspects of a method and system for detecting enhanced relative grants in a wireless communications system may include determining one or more signed signal power levels, wherein the one or more signed signal power levels may be positive E-RGCH signal levels or negative E-HICH signal levels. A probability density function may be estimated from the determined one or more signed signal power levels, and a decision threshold based on the estimated probability density function may be set. The probability density function may be estimated based on symmetry of the probability density function. The decision threshold may be set to achieve a desired probability of false positive detections. The decision threshold may be used to distinguish a received HOLD signal from a received DOWN signal for an E-RGCH channel, or to distinguish a received DTX signal from a received ACK signal for an E-HICH channel.

20 Claims, 8 Drawing Sheets

METHOD AND SYSTEM FOR DETECTING ENHANCED RELATIVE GRANTS IN A WIRELESS COMMUNICATIONS SYSTEM

CROSS-REFERENCE TO RELATED APPLICATIONS/INCORPORATION BY REFERENCE

This application makes reference to, claims priority to, and claims the benefit of U.S. Provisional Application Ser. No. 61/288,111, filed on Dec. 18, 2009.

FIELD OF THE INVENTION

Certain embodiments of the invention relate to signal processing for communication systems. More specifically, certain embodiments of the invention relate to a method and system for detecting enhanced relative grants in a wireless communications system.

BACKGROUND OF THE INVENTION

Mobile communication has changed the way people communicate and mobile phones have been transformed from a luxury item to an essential part of every day life. The use of mobile phones is today dictated by social situations, rather than hampered by location or technology. While voice connections fulfill the basic need to communicate, and mobile voice connections continue to filter even further into the fabric of every day life, the mobile Internet is the next step in the mobile communication revolution. The mobile Internet is poised to become a common source of everyday information, and easy, versatile mobile access to this data will be taken for granted.

Third (3G) and fourth generation (4G) cellular networks have been specifically designed to fulfill these future demands of the mobile Internet. As these services grow in popularity and usage, factors such as cost efficient optimization of network capacity and quality of service (QoS) will become even more essential to cellular operators than it is today. These factors may be achieved with careful network planning and operation, improvements in transmission methods, and advances in receiver techniques. To this end, carriers need technologies that will allow them to increase throughput and, in turn, offer advanced QoS capabilities and speeds that rival those delivered by cable modem and/or DSL service providers. Recently, advances in multiple antenna technology and other physical layer technologies have started to significantly increase available communication data rates.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and/or system for detecting enhanced relative grants in a wireless communications system, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for detecting enhanced relative grants in a wireless communications system. Aspects of the method and system for detecting enhanced relative grants in a wireless communications system may comprise determining one or more signed signal power levels, wherein the one or more signed signal power levels may be positive E-RGCH signal levels or negative E-HICH signal levels. The communication signals may be High Speed Uplink Packet Access signals. The determined one or more signed signal power levels may be derived from an E-HICH signal or E-RGCH associated with an E-DCH, using a same Orthogonal Variable Spreading Factor (OVSF) code. A probability density function may be estimated from the determined one or more signed signal power levels, and a decision threshold based on the estimated probability density function may be set.

The probability density function may be estimated based on symmetry of the probability density function. The decision threshold may be set to achieve a desired probability of false positive detections. The decision threshold may be used to distinguish a received HOLD signal from a received DOWN signal for an E-RGCH channel, or to distinguish a received DTX signal from a received ACK signal for an E-HICH channel. The probability density function may be estimated from an arbitrary estimation function based on the determined one or more signed signal power levels. The probability density function may be centered on zero, and the zero level may correspond to a DTX level or a HOLD level.

Figure 1A:
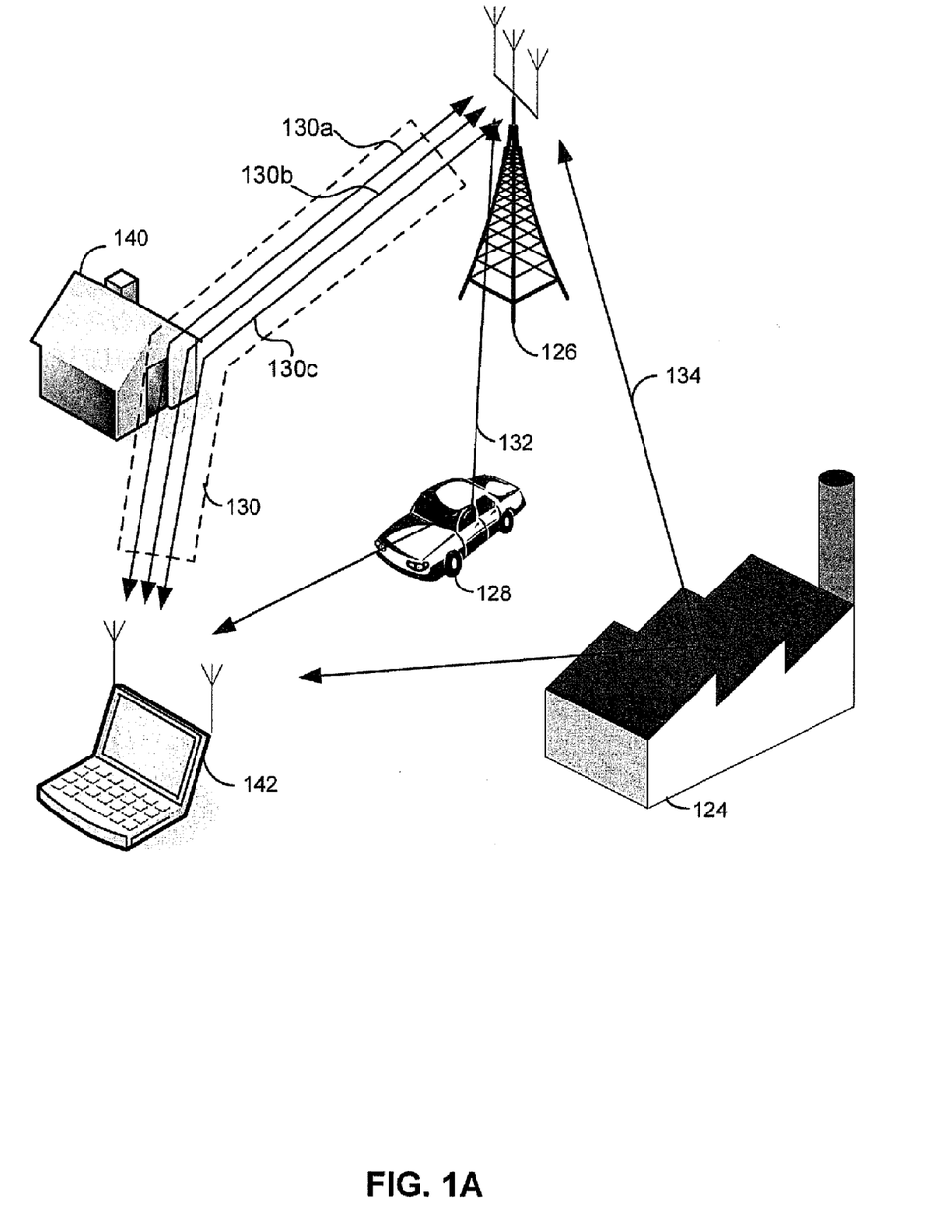
FIG. 1A is a diagram illustrating exemplary cellular multipath communication between a base station and a mobile computing terminal, in connection with an embodiment of the invention.

FIG. 1A is a diagram illustrating exemplary cellular multipath communication between a base station and a mobile computing terminal, in connection with an embodiment of the invention. Referring to FIG. 1A, there is shown a building 140 such as a home or office, a user equipment (UE) 142 (which might also be referred to as a mobile terminal), a factory 124, a base station 126, a car 128, and High Speed Packet Access (HSPA) communication paths 130, 132 and 134. The HSPA communication paths 130, 132, and 134 may comprise one or more physical channels, for example an Enhanced Relative Grant Channel (E-RGCH) 130*a*, and an a Hybrid ARQ Indicator Channel (E-HICH) 130*b*, and an Enhanced Dedicated Channel (E-DCH) 130*c*, as illustrated for HSPA communication path 130.

The base station 126 and the UE 142 may comprise suitable logic, circuitry, interfaces and/or code that may be enabled to generate and process MIMO communication signals.

Wireless communications between the base station 126 and the UE 142 may take place over a wireless channel. The wireless channel may comprise a plurality of HSPA communication paths, for example, the HSPA communication paths 130, 132 and 134. The wireless channel may change dynamically as the UE 142 and/or the car 128 moves. In some cases, the UE 142 may be in line-of-sight (LOS) of the base station 126. In other instances, there may not be a direct line-of-sight between the UE 142 and the base station 126 and the radio signals may travel as reflected HSPA communication paths between the communicating entities, as illustrated by the exemplary HSPA communication paths 130, 132 and 134. The radio signals may be reflected by man-made structures like the building 140, the factory 124 or the car 128, or by natural obstacles like hills. Such a system may be referred to as a non-line-of-sight (NLOS) communications system.

Signals communicated by the communication system may comprise both LOS and NLOS signal components. If a LOS signal component is present, it may be much stronger than NLOS signal components. In some communication systems, the NLOS signal components may create interference and reduce the receiver performance. This may be referred to as multipath interference. The HSPA communication paths 130, 132 and 134, for example, may arrive with different delays at the UE 142. The HSPA communication paths 130, 132 and 134 may also be differently attenuated. In the downlink, for example, the received signal at the UE 142 may be the sum of differently attenuated HSPA communication paths 130, 132 and/or 134 that may not be synchronized and that may dynamically change. Such a channel may be referred to as a fading multipath channel. A fading multipath channel may introduce interference but it may also introduce diversity and degrees of freedom into the wireless channel. Communication systems with multiple antennas at the base station and/or at the mobile terminal, for example MIMO systems, may be particularly suited to exploit the characteristics of wireless channels and may extract large performance gains from a fading multipath channel that may result in significantly increased performance with respect to a communication system with a single antenna at the base station 126 and at the UE 142, in particular for NLOS communication systems. Furthermore, Orthogonal Frequency Division Multiplexing (OFDM) systems may be suitable for wireless systems with multipath. To enable a communication receiver to decode data, and to deal with multipath propagation, for example via interference cancellation protocols, timing may be established with respect to the received signal, in particular frame timing, and slot timing. Further technologies to enhance data rates in mobile communication systems may comprise Enhanced Uplink and Enhanced Downlink technology, which may employ link adaptation technology, for example. The HSPA communication paths 130, 132, and/or 134 may be uplink channels, and as a result, are referred to as High Speed Uplink Packet Access (HSUPA) channels. The HSUPA channels may be characterized by high data rate transfers, and high-order modulation schemes, requiring relatively high signal-to-noise-and-interference ratios (SINRs). Thus, it may be desirable that HSUPA channels may be highly adaptive to varying channel conditions, and may utilize various techniques in order to exploit channel diversity, as described above.

Figure 1B:
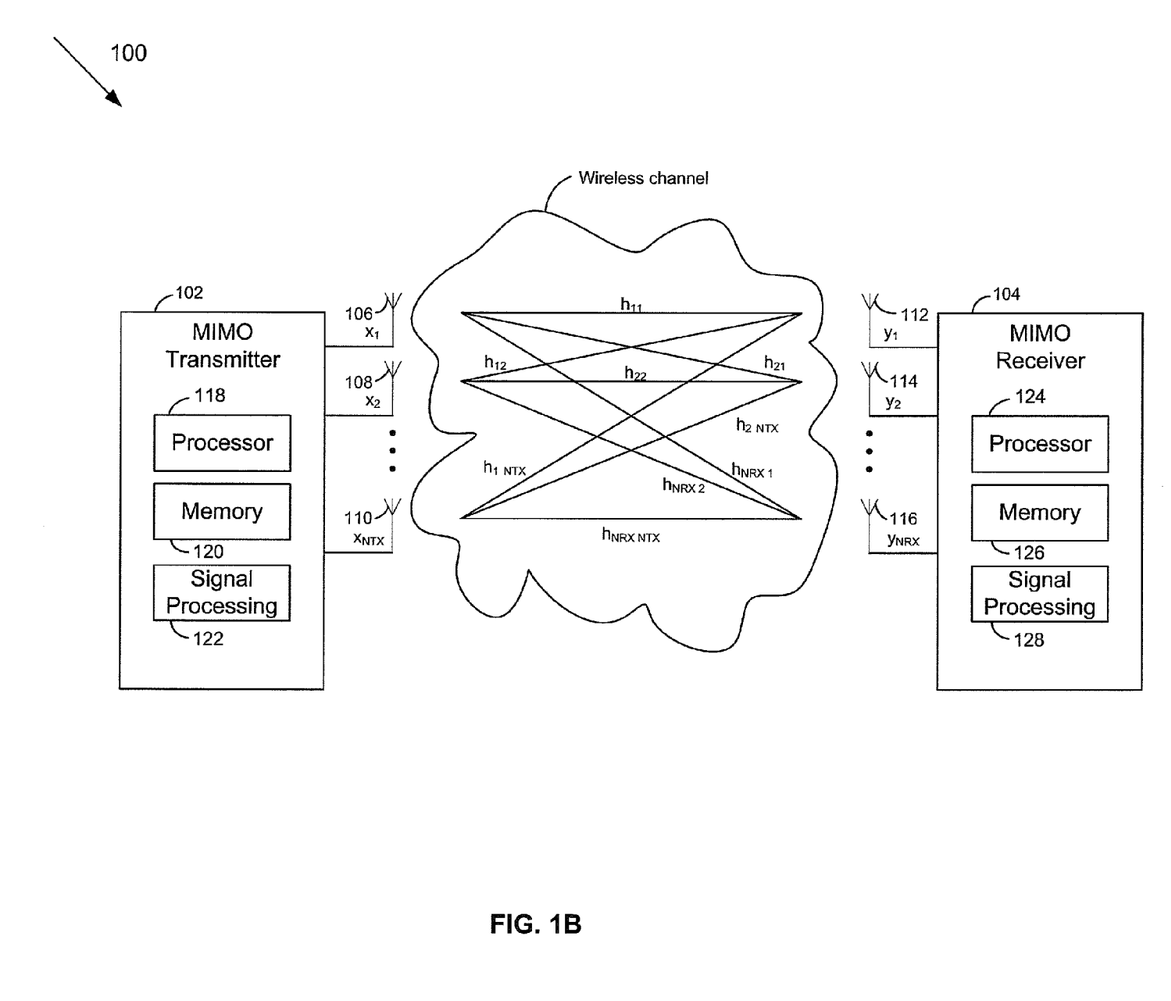
FIG. 1B is a diagram illustrating an exemplary MIMO communication system, in accordance with an embodiment of the invention.

FIG. 1B is a diagram illustrating an exemplary MIMO communication system, in accordance with an embodiment of the invention. Referring to FIG. 1B, there is shown a High Speed Packet Access (HSPA) system 100 comprising MIMO transmitter 102 and a MIMO receiver 104, and antennas 106, 108, 110, 112, 114 and 116. The MIMO transmitter 102 may comprise a processor module 118, a memory module 120, and a signal processing module 122. The MIMO receiver 104 may comprise a processor module 124, a memory module 126, and a signal processing module 128. There is also shown a wireless channel comprising HSPA communication paths $h_{11}, h_{12}, h_{22}, h_{21}, h_{2\ NTX}, h_{1\ NTX}, h_{NRX\ 1}, h_{NRX\ 2}, h_{NRX\ NTX}$, where $h_{mn}$ may represent a channel coefficient from transmit antenna n to receiver antenna m. There may be $N_{TX}$ transmitter antennas and $N_{RX}$ receiver antennas. There is also shown transmit symbols $x_1, x_2$ and $x_{NTX}$, and receive symbols $y_1, y_2$ and $y_{NRX}$. An HSPA system 100 may comprise HSDPA channels in the downlink, and HSUPA channels in the uplink.

The MIMO transmitter 102 may comprise suitable logic, circuitry and/or code that may be enabled to generate transmit symbols $x_i$ $i \in \{1, 2, \ldots N_{TX}\}$ that may be transmitted by the transmit antennas, of which the antennas 106, 108 and 110 may be depicted in FIG. 1B. The processor module 118 may comprise suitable logic, circuitry, and/or code that may be enabled to process signals. The memory module 120 may comprise suitable logic, circuitry, and/or code that may be enabled to store and/or retrieve information for processing in the MIMO transmitter 102. The signal processing module 122 may comprise suitable logic, circuitry and/or code that may be enabled to process signals, for example in accordance with one or more MIMO transmission protocols. The MIMO receiver 104 may comprise suitable logic, circuitry and/or code that may be enabled to process the receive symbols $y_i$ $i \in \{1, 2, \ldots N_{RX}\}$ that may be received by the receive antennas, of which the antennas 112, 114 and 116 may be shown in FIG. 1B. The processor module 124 may comprise suitable logic, circuitry, and/or code that may be enabled to process signals. The memory module 126 may comprise suitable logic, circuitry, and/or code that may be enabled to store and/or retrieve information for processing in the MIMO receiver 104. The signal processing module 128 may comprise suitable logic, circuitry and/or code that may be enabled to process signals, for example in accordance with one or more MIMO protocols. An input-output relationship between the transmitted and the received signal in a MIMO system may be specified as:

$$y = Hx + n$$

where $y = [y_1, y_2, \ldots y_{NRX}]^T$ may be a column vector with $N_{RX}$ elements, $.^T$ may denote a vector transpose, $H = [h_{ij}]: i \in \{1, 2, \ldots N_{RX}\}; j \in \{1, 2, \ldots N_{TX}\}$ may be a channel matrix of dimensions $N_{RX}$ by $N_{TX}$, $x = [x_1, x_2, \ldots x_{NTX}]^T$ is a column vector with $N_{TX}$ elements and n is a column vector of noise samples with $N_{RX}$ elements.

The system diagram in FIG. 1B may illustrate an exemplary multi-antenna system as it may be utilized in a Universal Mobile Telecommunication System (UMTS) Evolved Universal Terrestrial Radio Access (EUTRA) or Long-Term Evolution (LTE) system. Over each of the $N_{TX}$ transmit antennas, a symbol stream, for example $x_1(t)$ over antenna 106, may be transmitted. A symbol stream, for example $x_1(t)$, may comprise one or more symbols, wherein each symbol may be modulated onto a different sub-carrier. OFDM systems may generally use a relatively large number of subcarriers in parallel, for each symbol stream. For example, a symbol stream $x_1(t)$ may comprise symbols on carriers $f_m$: $m \in \{1, 2, \ldots M\}$, and M may be a subset of the FFT size that may be utilized at the receiver. For instance, with FFT sizes of N, N>M and may create guard-tones that may allow utilization of variable bandwidth when deployed, for example, 64, 128, or 512 sub-carriers. The M sub-carriers may comprise a symbol stream $x_1(t)$, for example, that may occupy a bandwidth of a few kilohertz to a few megahertz.

Common bandwidth may be between 1 MHz and up to 100 MHz, for example. Thus, each symbol stream may comprise one or more sub-carriers, and for each sub-carrier a wireless channel may comprise multiple transmission paths. For example, a wireless channel $h_{12}$ from transmit antenna 108 to receive antenna 112, as illustrated in the figure, may be multidimensional. In particular, the wireless channel $h_{12}$ may comprise a temporal impulse response, comprising one or more multipath components. The wireless channel $h_{12}$ may also comprise a different temporal impulse response for each sub-carrier $f_m$ of the symbol stream, for example $x_2(t)$. The wireless channels as illustrated in FIG. 1B depicts a spatial dimension of the wireless channel because the transmitted signal from each transmit antenna may be received differently at each receiver antenna. Thus, a channel impulse response may be measured and/or estimated for each sub-carrier.

To enable decoding of data, and channel estimation, frame timing may be acquired in accordance with various embodiments of the invention. The transmission of small transmission entities, for example bits, may be arranged into larger units consisting of several consecutive bits, and/or symbols. These larger units may be slots, and multiple consecutive slots may be referred to as a frame. To enable data reception, both slot and frame timing may be determined at the receiver.

In accordance with various embodiments of the invention, a method and system for detecting enhanced relative grants in wireless communication systems may be implemented in a High-Speed Uplink Packet access (HSUPA) system, which may be also be referred to as Enhanced Uplink. HSUPA may be utilizing link adaptation methods, and the invention may utilize single or multiple antennas at a transmitter and/or receiver, in accordance with various embodiments of the invention. HSUPA may comprise several physical layer channels, for example an Enhanced Relative Grant Channel (E-RGCH 130a), and an a Hybrid ARQ Indicator Channel (E-HICH 130b) for an Enhanced Dedicated Channel (E-DCH 130c).

An E-RGCH 130a, for example, may be a dedicated channel that the base station (BS) may use to send relative grants to a UE (user equipment, or mobile station). A relative grant, may determine a data rate limit for a communication channel, with regard to some known data rate. In some instances, there may be three possible relative grants from a serving BS to a mobile station: UP, HOLD, and DOWN. This may be the case when the serving cell/base station transmits grants to a given UE. The BS may use these commands to respectively increase, hold, or decrease grants of data rates to a UE, which may be used for transmitting data to a BS on an uplink E-DPDCH (enhanced dedicated packet data channel). In other instances, the UE may receive grant commands from one or more non-serving cells. This may occur when the interference generated exceeds a threshold, for example, and neighboring cells to the serving cell may request a decrease in transmission power at the UE. In these instances, a non-serving base station may be operable to transmit two possible relative grants to a mobile station: HOLD or DOWN. In most instances, non-serving cells may only relatively rarely send DOWN commands, and may transmit a HOLD command more frequently. In accordance with various embodiments of the invention, the HOLD commands to a UE from a non-serving cell may be implied by the absence of a DOWN command, in some instances.

An E-HICH 130b, for example, may be a dedicated channel that the BS may use to send Hybrid Automatic Repeat-reQuests (HARQ) indicators to a UE. There may be three messages from the serving BS: ACK, DTX, or NACK (referring to Acknowledgement, Discontinuous transmission, Negative Acknowledgement, respectively). The BS may use these commands to inform a UE about the receipt of associated previously transmitted data frames. In particular, the HARQ indicators may be based on Cyclic Redundancy Checks (CRCs). In other instances, a non-serving base station may transmit E-HICH 130b messages. In those instances, there may be two possible messages: ACK and DTX.

The E-RGCH 130a and E-HICH 130b associated with a given user and/or communication may both use the same Orthogonal Variable Spreading Factor (OVSF) code for spreading at the base station. The E-RGGH and E-HICH 130b may be distinguished by different signature indices assigned to them. Since both channels may share the same OVSF code, the OVSF code power over the total cell power may be identical for E-RGCH 130a and E-HICH 130b. In some instances, a digital gain factors may be applied on an E-RGCH 130a and/or a E-HICH 130b before OVSF code spreading may be performed. The gain factors for E-RGCH 130a and for E-HICH 130b may or may not be identical, in accordance with various embodiments of the invention. In some instances, gain factors may be determined from within a range, for example based on network tests and/or interoperability tests.

Figure 2:
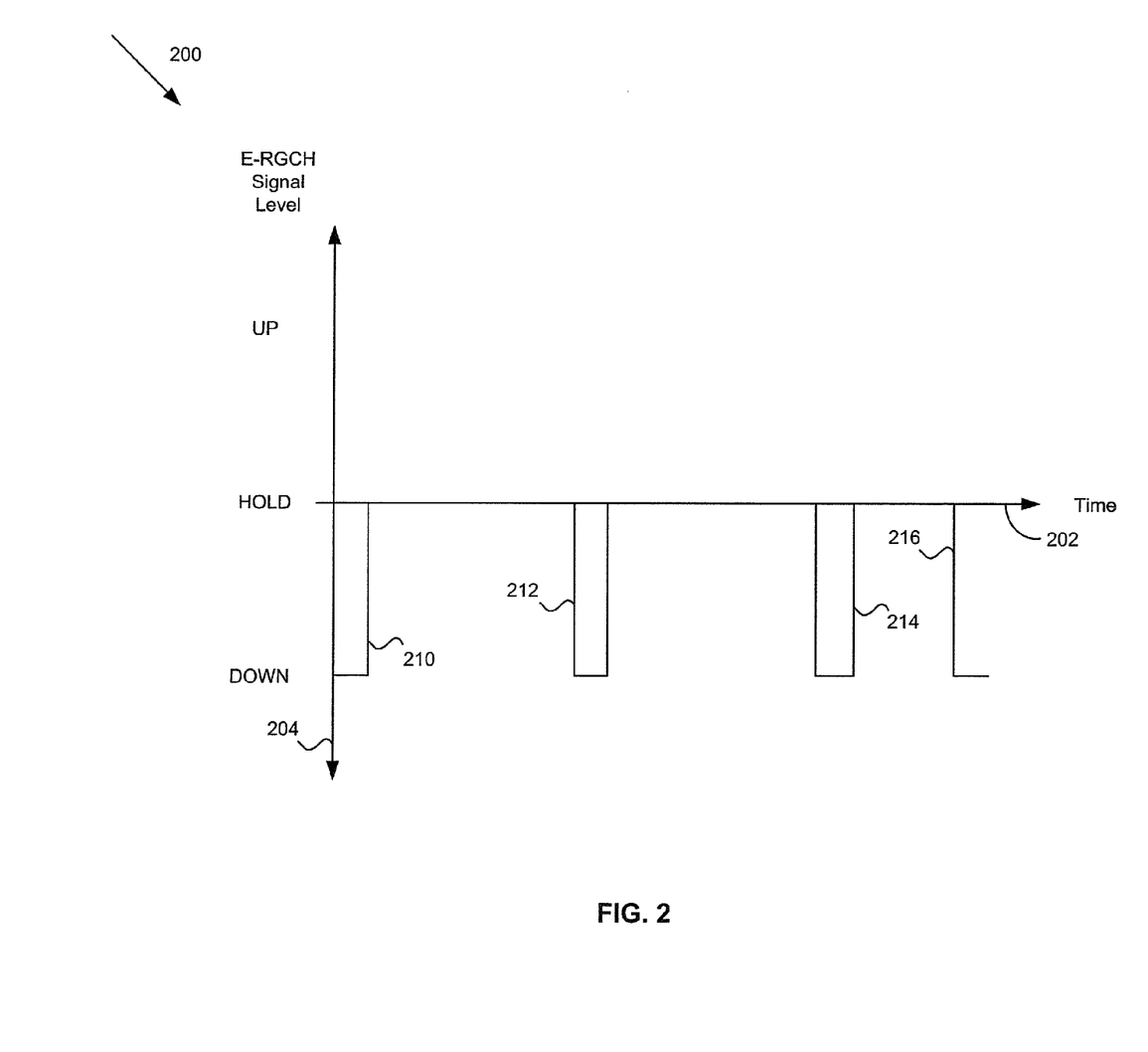
FIG. 2 is an illustration of an exemplary E-RGCH signal from a non-serving base station, in accordance with various embodiments of the invention.

FIG. 2 is an illustration of an exemplary E-RGCH signal from a non-serving base station, in accordance with various embodiments of the invention. Referring to FIG. 2, there is shown a signal level illustration 200, comprising a time axis 202, an E-RGCH signal level axis 204, and DOWN signals 210, 212, 214 and 216. There is also indicated a HOLD level.

The E-RGCH and the E-HICH from non-serving cell(s)/base station(s) may have specific frame timings and frame sizes. In order to detect E-RGCH signals reliably, the UE may improve signal detection accuracy. An E-RGCH signal from a non-serving base station comprising HOLD or DOWN levels may be binary, for example. This is illustrated in FIG. 2, where there is an exemplary negative amplitude DOWN level and an exemplary zero amplitude HOLD level. A HOLD level signal may indicate that a data rate granted may be held, that is, a user may not exceed data rates previously granted. In instances when the data rate granted changes, for example due to changing channel conditions, a relative grant signal may be sent, which indicates whether the data rate grant my be decreased (DOWN) relative to the previous data rate grant level (to maintain, HOLD). For example, after the DOWN signal 210, the E-RGCH 130a may remain at HOLD, until a DOWN signal 212 may be transmitted, indicating that the granted data rate may be further reduced. Some time later, for example, the channel conditions may deteriorate further, and a DOWN signal 214 my further reduce the granted data rate. In accordance with various embodiments of the invention, in many instances, the E-RGCH 130a signal from a non-serving base station may remain at the HOLD signal level for most of the time. Because for non-serving base stations it is generally undesirable to require a transmit power adjustment of a UE served by another cell, it may be rare that a DOWN message is transmitted to a non-served mobile station. Hence, by setting the HOLD level at zero, for example, the absence of a signal significantly different from zero may be considered a HOLD signal level.

Due to changing or varying channel conditions comprising attenuation and noise, for example, the receiver may not know at what levels the HOLD and/or DOWN levels may be situated, and may thus be at a certain risk to detect a wrong E-RGCH 130*a* signal. Because a wrong detection of a DOWN signal may lower the data rate at the receiving UE beyond the data rates supported for a given quality of service, the communication may be inefficient. In some instances, the problem may be further compounded if no error coding may be used on the E-RGCH 130*a* signal.

Figure 3:
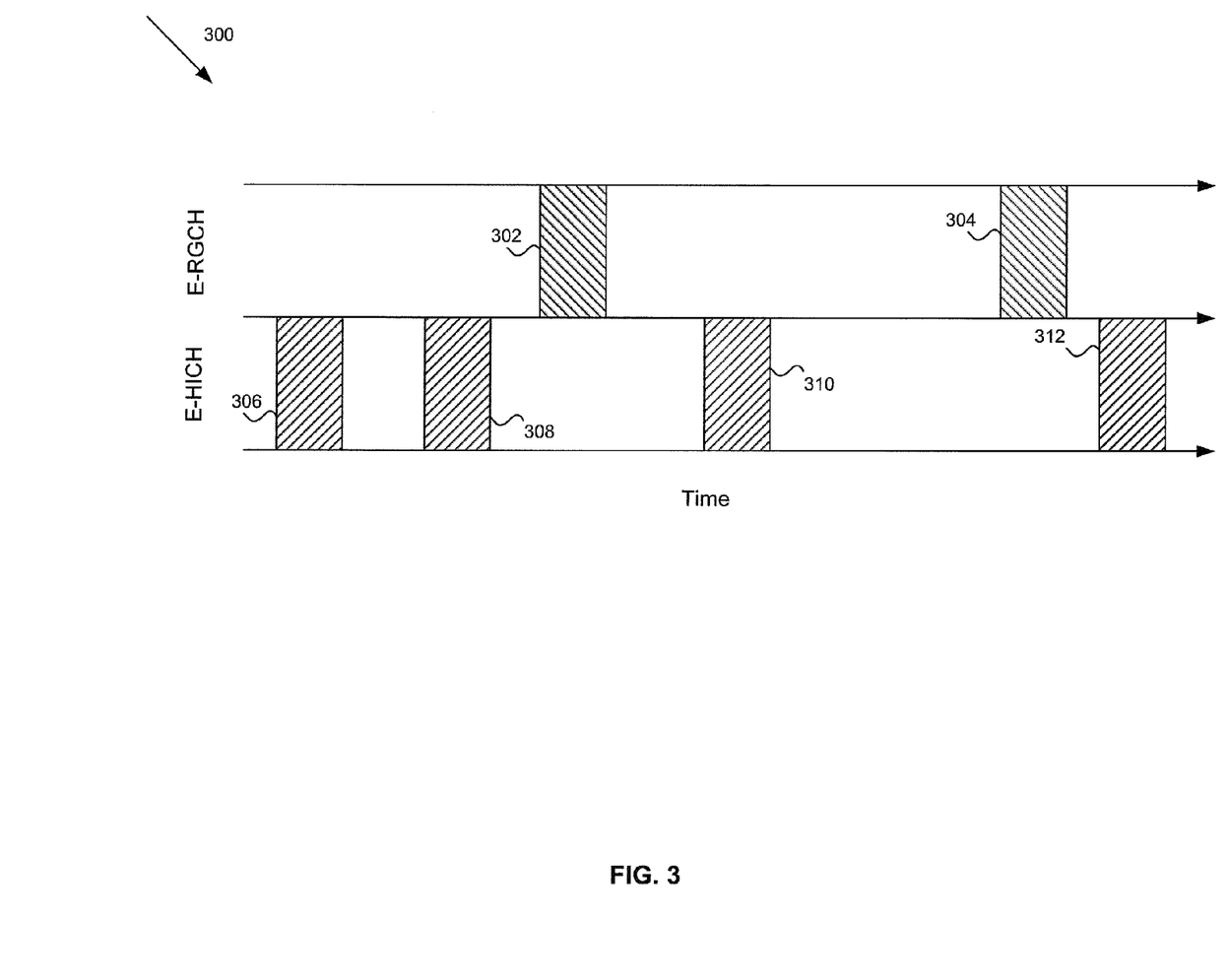
FIG. 3 illustrates exemplary transmission for E-HICH and E-RGCH from a non-serving base station, in accordance with an embodiment of the invention.

FIG. 3 illustrates exemplary transmission for E-HICH and E-RGCH from a non-serving base station, in accordance with an embodiment of the invention. Referring to FIG. 3, there is shown a signal schedule 300, comprising E-RGCH signals 302 and 304, and E-HICH signals 306, 308, 310, and 312. There is also shown a time axis.

The E-HICH 130*b* may be a downlink dedicated physical channel that may carry binary hybrid ARQ acknowledgments to inform the UE about quality of detection of the E-DCH at the base station. When no transmission is detected, the E-HICH 130*b* may not transmit any data, for example to conserve energy. The E-HICH 130*b* sent from the serving base station may have allocated Transmission Time Intervals (TTIs) in which it may transmit, and which may be known to the receiving UE. The timing of the E-HICH 130*b* may, for example, depend on the downlink DPCH timing. When an E-RGCH 130*a* or an E-HICH 130*b* may be transmitted from a non-serving base station, they may not be assigned any specific transmission times. The E-RGCH 130*a* and E-HICH 130*b* may share a similar structure and may use a same channelization code and scrambling code.

In accordance with various embodiments of the invention, the E-HICH 130*b* and E-RGCH 130*a* may share a common OVSF code. The E-RGCH 130*a* transmissions may not be scheduled from serving and non-serving base stations, for example. Because the E-HICH 130*b* and the E-RGCH 130*a* may be transmitted relatively rarely from non-serving base stations, it may be desirable to measure the E-HICH 130*b* or E-RGCH 130*a* power over time. Because the E-RGCH 130*a*, for example, may be at the HOLD level most frequently, the absence of an E-HICH 130*b* signal may be used to estimate the signal level of the E-RGCH 130*a* HOLD level. In these instances, the measured (and, for example, averaged) signal-and-noise power level, may be associate with the E-RGCH HOLD level, which in turn may be used to estimate the levels of the UP and DOWN E-RGCH signals.

Figure 4:
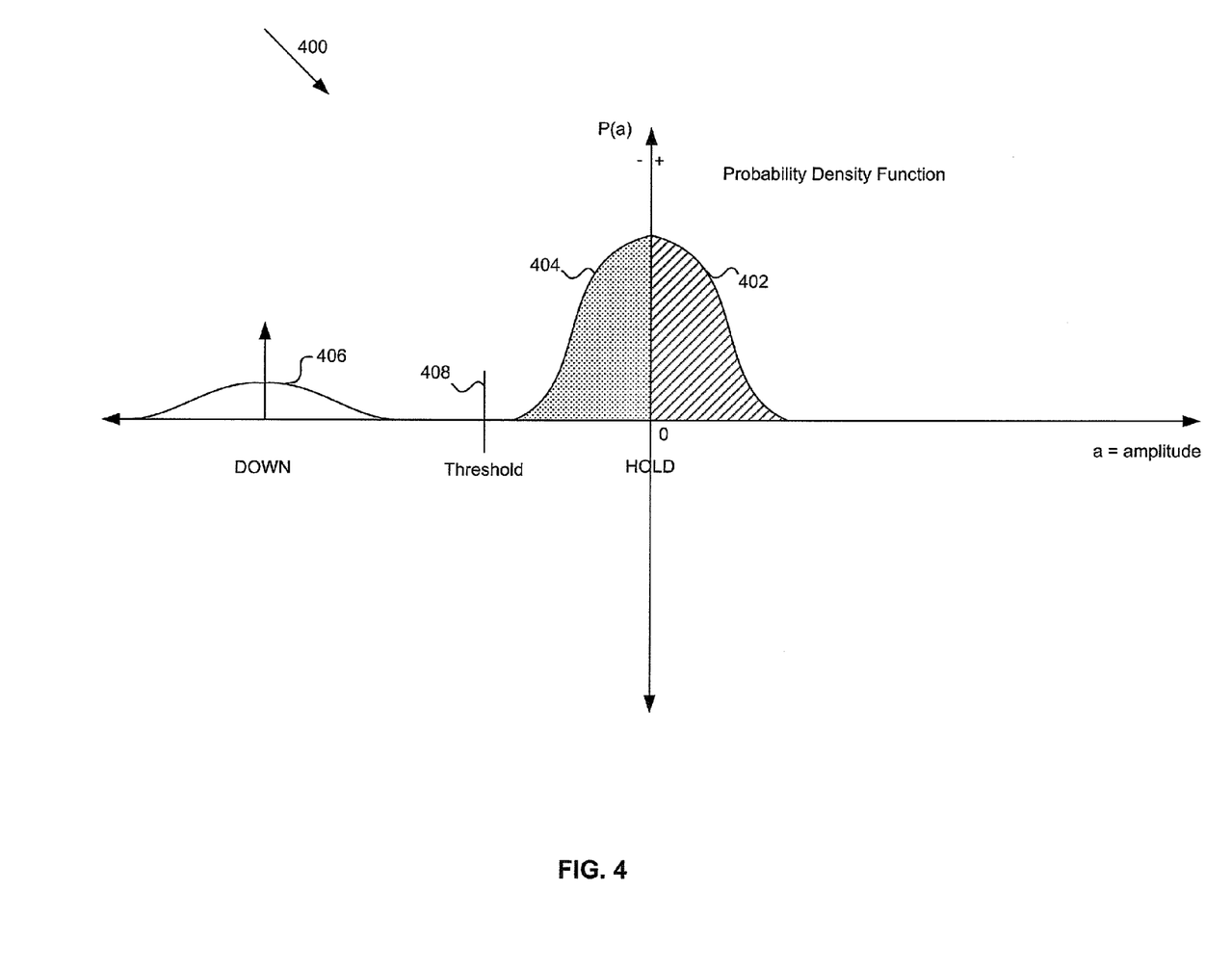
FIG. 4 is a probability density function plot illustrating an exemplary E-RGCH signal amplitude distribution from a non-serving base station to a UE, in accordance with an embodiment of the invention.

FIG. 4 is a probability density function plot illustrating an exemplary E-RGCH signal amplitude distribution from a non-serving base station to a UE, in accordance with an embodiment of the invention. Referring to FIG. 4, there is shown a probability density function plot 400 comprising a horizontal amplitude axis, and a vertical probability axis. The probability density function comprises a concentration of signal amplitudes around the zero amplitude level, for example, associated with the HOLD signal level. The signal level concentrated around the HOLD level comprises positive HOLD level amplitudes 402, and negative HOLD level amplitudes 404. A second concentration of amplitudes from the probability density function may be around the DOWN level, and is illustrated by the DOWN level amplitudes 406. There is also shown a threshold 408. As can be seen from the probability density function plot 400, the amplitudes around the DOWN level may be less frequent that amplitudes around the HOLD level, in accordance with various embodiments of the invention.

In operation, when an E-RGCH 130*a* signal may be received by the UE from a non-serving base station, it may be desirable to determine whether the received signal is a HOLD signal, or a DOWN signal. To this end, the level of the threshold 408 may be determined, and the threshold 408 may be utilized to decide whether a given received signal may be a HOLD signal, or a DOWN signal. For example, in accordance with an embodiment of the invention as illustrated in FIG. 4, a received amplitude of the E-RGCH 130*a* signal greater than the threshold 408 may be determined to be a HOLD signal, while a received E-RGCH 130*a* amplitude less than the threshold 408 may be determined to be a DOWN signal.

In accordance with various embodiments of the invention, the PDF around the HOLD level may be centered on zero, for example, and the distribution around it may be determined by noise and/or interference terms. In many instances, as depicted in FIG. 4, the PDF around the HOLD level may be substantially symmetrical around the zero level. Hence, it may be desirable to estimate the distribution of the PDF around the HOLD level from received E-RGCH 130*a* amplitudes that may be positive, leading to an estimate of positive HOLD level amplitudes 402. Any estimation process may be used to estimate the PDF around the HOLD level. Because of the symmetry assumed between the positive HOLD level amplitudes 402 and the negative HOLD level amplitudes 404, the part of the PDF centered on HOLD may be approximately known.

Based on the assumed and estimated PDF comprising the positive HOLD level amplitudes 402 and the negative HOLD level amplitudes 404, and a threshold 408 may be defined at an arbitrary, desired level of correct detection probability for the HOLD level. Because in most instances, the part of the PDF centered on the HOLD level will dominate, that is the HOLD signal is much more likely to be transmitted than the DOWN signal, estimating the part of the PDF centered around the HOLD level may allow a suitable determination of the PDF in order to set a threshold 408 that may reduce the number of false positives for a DOWN signal.

Figure 5:
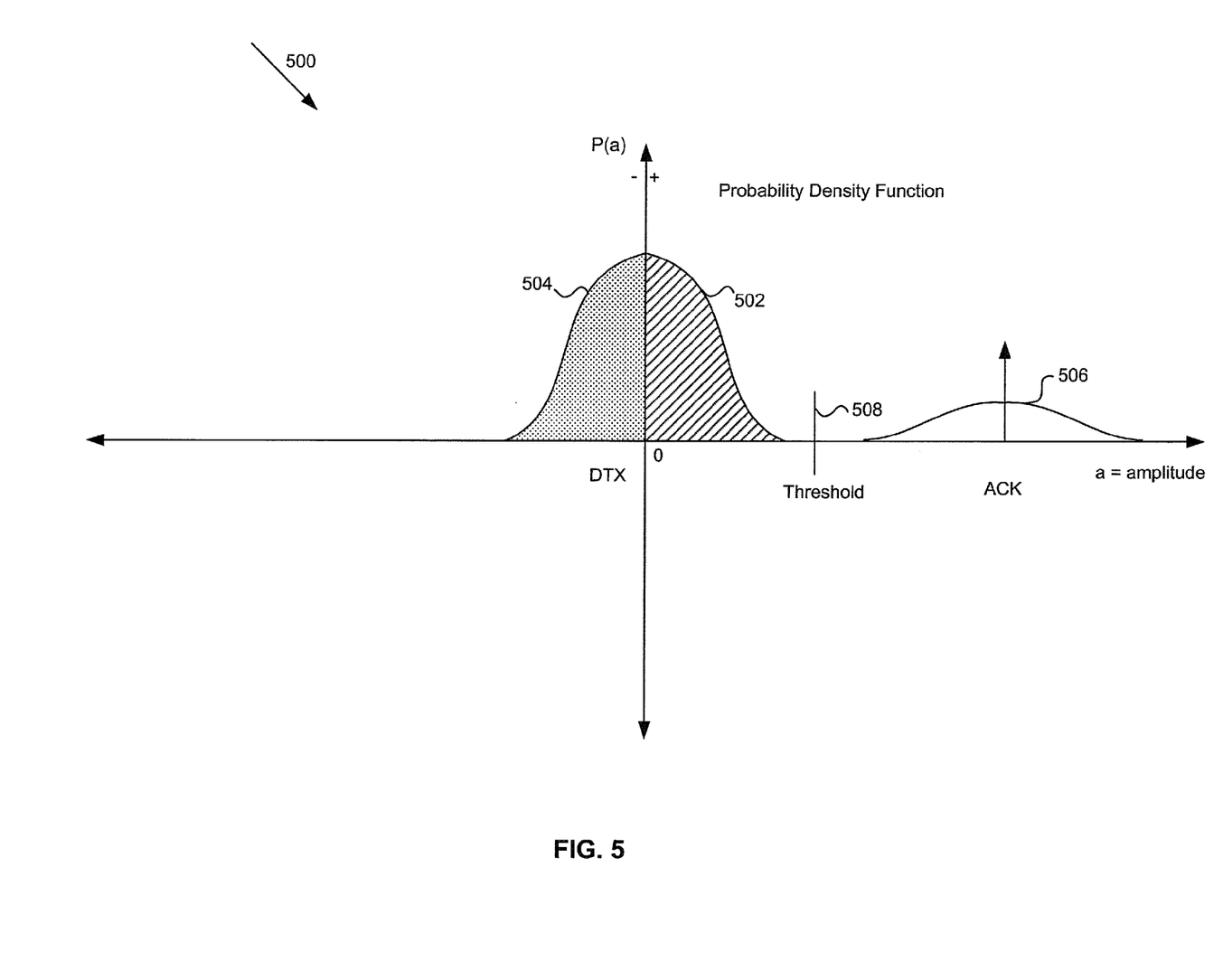
FIG. 5 is a probability density function plot illustrating an exemplary E-HICH signal amplitude distribution from a non-serving base station to a UE, in accordance with an embodiment of the invention.

FIG. 5 is a probability density function plot illustrating an exemplary E-HICH 130*b* signal amplitude distribution from a non-serving base station to a UE, in accordance with an embodiment of the invention. Referring to FIG. 5, there is shown a probability density function plot 500 comprising a horizontal amplitude axis, and a vertical probability axis. The probability density function comprises a concentration of signal amplitudes around the zero amplitude level, for example, associated with the DTX level. The signal level concentrated around the DTX level comprises positive DTX level amplitudes 502, and negative DTX level amplitudes 504. A second amplitude concentration for the probability density function may be concentrated around the ACK level, and is illustrated by the ACK level amplitudes 506. There is also shown a threshold 508. As can be seen from the probability density function plot 500, the amplitudes around the ACK level may be less frequent that amplitudes around the DTX level, in accordance with various embodiments of the invention.

In operation, when an E-HICH 130*b* signal may be received by the UE from a non-serving base station, it may be desirable to determine whether the received signal amplitude may correspond to a DTX signal, or an ACK signal. To this end, the level of the threshold 508 may be determined, and the threshold 508 may be utilized to decide whether a given received signal may be a DTX signal, or an ACK signal. For example, in accordance with an embodiment of the invention as illustrated in FIG. 5, a received amplitude of the E-H ICH 130*b* signal greater than the threshold 508 may be determined to be an ACK signal, while a received E-HICH 130*b* amplitude less than the threshold 508 may be determined to be a DTX signal.

In accordance with various embodiments of the invention, the PDF around the DTX level may be centered on zero, for example, and the distribution around it may be determined by noise and/or interference terms. In many instances, as depicted in FIG. 5, the PDF around the DTX level may be substantially symmetrical around the zero level. Hence, it may be desirable to estimate the distribution of the PDF around the DTX level from received E-HICH 130*b* amplitudes that may be negative, leading to an estimate of negative DTX level amplitudes 504. Any estimation process may be used to estimate the PDF around the DTX level. Because of the symmetry assumed between the positive DTX level amplitudes 502 and the negative DTX level amplitudes 504, the part of the PDF centered on DTX may be approximately derived.

Based on the assumed and estimated PDF comprising the positive DTX level amplitudes 502 and the negative DTX level amplitudes 504, a threshold 508 may be defined at an arbitrary, desired level of correct detection probability for the DTX level. Because in most instances, the part of the PDF centered on the DTX level will dominate, that is the DTX signal is much more likely to be transmitted than the ACK signal, estimating the part of the PDF centered around the DTX level may allow a suitable determination of the PDF in order to set a threshold 508 that may reduce the number of false positives for an ACK signal.

Figure 6A:
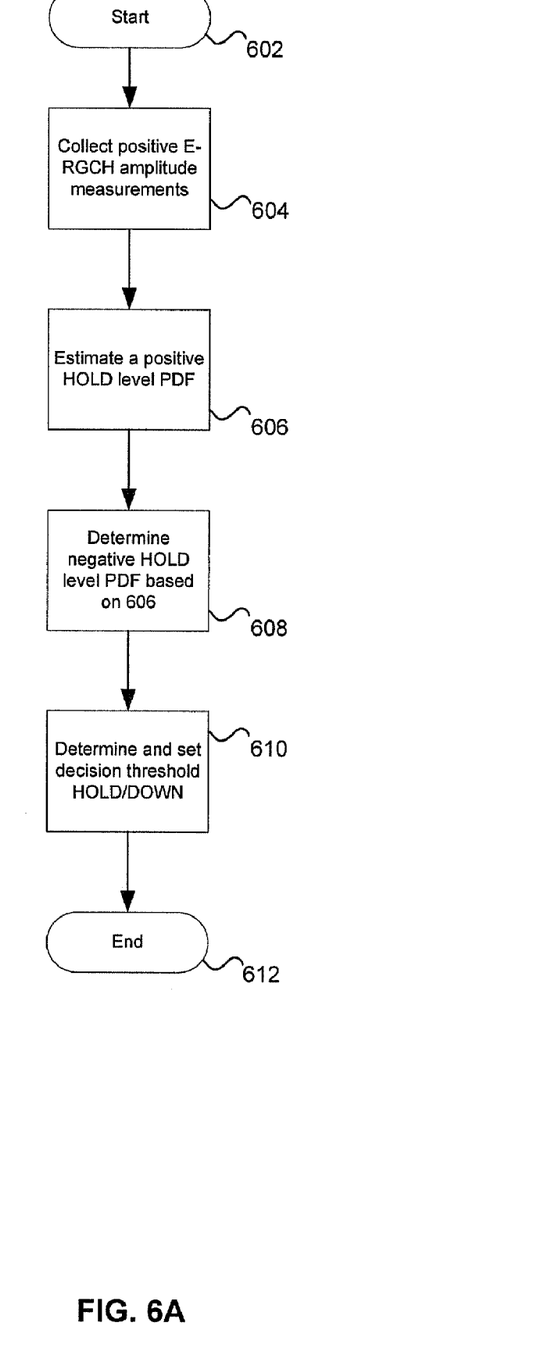
FIG. 6A is a flow chart illustrating an exemplary threshold estimation for the E-RGCH, in accordance with an embodiment of the invention.

FIG. 6A is a flow chart illustrating an exemplary threshold estimation for the E-RGCH, in accordance with an embodiment of the invention. The estimation process may commence in step 602. In step 604, the UE may receive E-RGCH 130*a* signals, which may comprise HOLD or DOWN signals. In accordance with various embodiments of the invention, the UE may collect received E-RGCH 130*a* signals with positive amplitudes. Because of the PDF of the received signal, there is a high probability that a positive amplitude signal that may be received may be associated to a HOLD signal, as illustrated in FIG. 4. In step 606, the UE may utilize the collected positive level received signals to estimate the positive HOLD level amplitudes 402 part of the PDF, which may be associated with positive received E-RGCH 130*a* signals at the UE. Based on the symmetry property associated with the PDF centered on the HOLD level comprising positive HOLD level amplitudes 402 and negative HOLD level amplitudes 404, the negative HOLD level amplitudes 404 may be estimated from the positive HOLD level amplitudes 402 in step 608. In step 610, using at least the positive HOLD level amplitudes 402 and the negative HOLD level amplitudes 404, the threshold 408 may be determined. The threshold 408 may be determined so that desirably low rates of false positives for DOWN signals may be decided at the UE, based on the received E-RGCH 130*a* signal amplitudes.

Figure 6B:
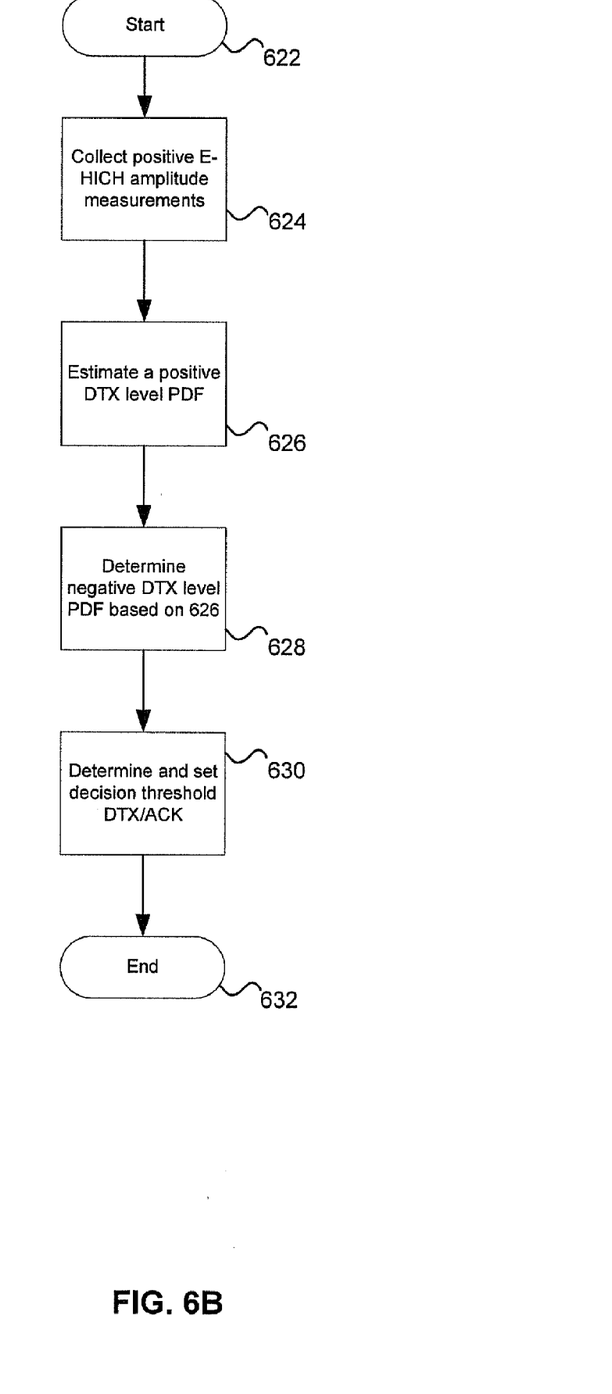
FIG. 6B is a flow chart illustrating an exemplary threshold estimation for the E-HICH, in accordance with an embodiment of the invention.

FIG. 6B is a flow chart illustrating an exemplary threshold estimation for the E-HICH, in accordance with an embodiment of the invention. The estimation process may commence in step 622. In step 624, the UE may receive E-HICH 130*b* signals, which may comprise DTX or ACK signals. In accordance with various embodiments of the invention, the UE may collect received signals with negative amplitudes. Because of the PDF of the received signal, there is a high probability that a negative amplitude signal that may be received may be associated to a DTX signal. In step 626, the UE may utilize the collected negative level received signals to estimate the negative DTX level amplitudes 504 part of the PDF, which may be associated with negative received E-HICH 130*b* signals at the UE. Based on the symmetry property associated with the PDF centered on the DTX level comprising negative DTX level amplitudes 504 and positive DTX level amplitudes 502, the positive DTX level amplitudes 502 may be estimated from the negative DTX level amplitudes 504 in step 628. In step 630, using at least the positive DTX level amplitudes 502 and the negative DTX level amplitudes 504, the threshold 508 may be determined. The threshold 508 may be determined so that desirably low rates of false positives for ACK signals may be decided at the UE, based on the received E-HICH 130*b* signal amplitudes.

In accordance with an embodiment of the invention, a method and system for detecting enhanced relative grants in a wireless communications system may comprise determining one or more signed signal power levels, wherein the one or more signed signal power levels may be positive E-RGCH signal levels or negative E-HICH signal levels, as illustrated in FIG. 4, FIG. 5, FIG. 6A and FIG. 6B, for example. A probability density function, for example probability density function 502, may be estimated from the determined one or more signed signal power levels, for example for an E-CHICH signal as described in FIG. 5, and a decision threshold 508 based on the estimated probability density function 502 may be set.

The probability density function may be estimated based on symmetry of the probability density function. For example as illustrated in FIG. 4 and FIG. 5. The decision threshold may be set to achieve a desired probability of false positive detections, as described for FIG. 4 and FIG. 5. The decision threshold, for example threshold 408, may be used to distinguish a received HOLD signal from a received DOWN signal for an E-RGCH channel as shown in FIG. 4, or to distinguish a received DTX signal from a received ACK signal for an E-HICH channel, as shown in FIG. 5. The probability density function may be estimated from an arbitrary estimation function based on the determined one or more signed signal power levels. The communication signals, for example as shown in FIG. 1A and FIG. 1B, may be High Speed Uplink Packet Access signals. The determined one or more signed signal power levels may be derived from an E-HICH signal or E-RGCH associated with an E-DCH, using a same Orthogonal Variable Spreading Factor (OVSF) code. The probability density function may be centered on zero, and the zero level may correspond to a DTX level or a HOLD level, as illustrated in FIG. 4 and FIG. 5, for example.

Another embodiment of the invention may provide a machine-readable and/or computer-readable storage and/or medium, having stored thereon, a machine code and/or a computer program having at least one code section executable by a machine and/or a computer, thereby causing the machine and/or computer to perform the steps as described herein for detecting enhanced relative grants in a wireless communications system.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for processing communication signals comprising:
    identifying a first power level for a first grant and a second power level for a second grant;
    measuring a plurality of power levels of a signed signal on a communication channel;
    calculating a first range of power levels based on the measured power levels,
        wherein if the first power level is greater than the second power level, the calculation is based on measured power levels greater than the first power level, and
        wherein if the first power level is less than the second power level, the calculation is based on measured power levels less than the first power level;
    estimating a second range of power levels based on the first range; and
    selecting a decision threshold based, at least in part, on the first range and the second range.

2. The method according to claim 1, comprising selecting the decision threshold to achieve a desired probability of false positive detections.

3. The method according to claim 1, comprising estimating the second range from an arbitrary estimation function based on the first range.

4. The method according to claim 1, wherein the communication channel is a High Speed Uplink Packet Access channel.

5. The method according to claim 1, wherein the first range is derived from a Hybrid ARQ Indicator Channel (E-HICH) signal or an Enhanced Relative Grant Channel (E-RGCH) signal associated with an Enhanced Dedicated Channel (E-DCH), using the same Orthogonal Variable Spreading Factor code.

6. The method according to claim 1, wherein the plurality of power levels are centered on zero.

7. The method according to claim 6, wherein the zero level corresponds to a DTX level or a HOLD level.

8. A system for processing communication signals comprising:
    a processor, circuit, or combination thereof configured to identify a first power level for a first grant and a second power level for a second grant;
    a processor, circuit, or combination thereof configured to measure a plurality of power levels of a signed signal on a communication channel;
    a processor, circuit, or combination thereof configured to calculate a first range of power levels based on the measured power levels,
        wherein if the first power level is greater than the second power level, the calculation is based on measured power levels greater than the first power level, and
        wherein if the first power level is less than the second power level, the calculation is based on measured power levels less than the first power level;
    a processor, circuit, or combination thereof configured to estimate a second range of power levels based on the first range; and
    a processor, circuit, or combination thereof configured to select a decision threshold based, at least in part, on the first range and the second range.

9. The system according to claim 8, wherein a processor, circuit, or combination thereof is configured to set the decision threshold to achieve a desired probability of false positive detections.

10. The system according to claim 8, wherein a processor, circuit, or combination thereof is configured to estimate the second range from an arbitrary estimation function based on the first range.

11. The system according to claim 8, wherein the communication channel is a High Speed Uplink Packet Access channel.

12. The system according to claim 8, wherein the first range is derived from a Hybrid ARO Indicator Channel (E-HICH) signal or an Enhanced Relative Grant Channel (E-RGCH) signal associated with an Enhanced Dedicated Channel (E-DCH), using the same Orthogonal Variable Spreading Factor code.

13. The system according to claim 8, wherein the plurality of power levels are centered on zero.

14. The system according to claim 13, wherein the zero level corresponds to a DTX level or a HOLD level.

15. The method of claim 1, wherein the step of estimating the second range is based on a symmetry of the first range and the second range around the first power level.

16. The method of claim 1, wherein the signed signal is an Enhanced Relative Grant Channel (E-RGCH), the first grant is a Hold grant, and the second grant is a Down grant.

17. The method of claim 1, wherein the signed signal is a Hybrid ARQ Indicator Channel (E-HICH), the first grant is a DTX grant, and the second grant is an ACK grant.

18. The system of claim 8, wherein the processor, circuit, or combination thereof is configured to estimate the second range based on a symmetry of the first range and the second range around the first power level.

19. The system of claim 8, wherein the signed signal is an Enhanced Relative Grant Channel (E-RGCH), the first grant is a Hold grant, and the second grant is a Down grant.

20. The system of claim 8, wherein the signed signal is a Hybrid ARQ Indicator Channel (E-HICH), the first grant is a DTX grant, and the second grant is an ACK grant.

* * * * *